United States Patent [19]
Kalakov et al.

[11] 3,849,046
[45] Nov. 19, 1974

[54] EXTRUDER WITH ROTATING DIE HEAD

[76] Inventors: **Nikolai Efimovich Kalakov;
Svyatoslav Sergeevich Shipitsin,**
both of ulitsa K. Marxa, 10, kv. 10;
**Veniamin Alexandrovich
Minchenko,** Mikroraion 13, 15, kv.
75; **Innokenty Mikhailovich
Kudryavtsev,** ulitsa Zhilyabieva, 13,
29; Vladimir Afanasievich Zimin,
ulitsa Pushina 9/13, kv. 1; **Boris
Antonovich Pervitsky,** ulitsa
Sayanskaya, 13, kv. 71, all of
Angarsk, Irkutskoi oblasti, U.S.S.R.

[22] Filed: Sept. 18, 1972

[21] Appl. No.: 290,144

[30] Foreign Application Priority Data
Jan. 26, 1972  U.S.S.R. ............................. 174822
Apr. 12, 1972  U.S.S.R. ............................ 1772494

[52] U.S. Cl. ................. 425/208, 425/382, 425/464
[51] Int. Cl. .............................................. B29f 3/06
[58] Field of Search ......................... 425/461–464,
425/376–382, 207–209, 288, 113, 190–192

[56] References Cited
UNITED STATES PATENTS
3,574,890  4/1971  Gresch .............................. 425/191
3,642,406  2/1972  Irving ................................ 425/382

*Primary Examiner*—Robert D. Baldwin
*Assistant Examiner*—John McQuade
*Attorney, Agent, or Firm*—Waters, Roditi, Schwartz & Nissen

[57] ABSTRACT

A machine for granulation of pastelike materials employed to produce a catalyst in the form of spherical granules used in the chemical industry. The machine comprises an extruder and a rotating die head, the die head being rotated by an individual drive independently of the rotation of the extruder elements relative to one another. Such a design permits controlling the feed of pastelike material during one turn of the die head and enables the die head to be used in combination with any type of extruder.

2 Claims, 2 Drawing Figures

EXTRUDER WITH ROTATING DIE HEAD

The invention relates to chemical equipment, and more particularly to machines for granulation of pastelike materials widely used in catalytic processes.

Pastelike materials are currently granulated with various types of horizontal and vertical extruders having a variety of cutting and molding devices, and also with special roller granulators. Most granulating devices are designed to produce cylindrical granules of various sizes as well as powder granules. This category of granulators includes a range of string cutters, shearing cutters, cutting-disk machines and also various extruders. Quite a few chemical processes, however, require a catalyst with a low hydrodynamic drag, a well-developed active surface, an increased strength and abradability. These conditions are by and large met by a catalyst in the form of spherical granules.

It is known in the art to produce granules from pastelike materials with a machine which comprises a rotating body rigidly coupled with an intake hopper and a die head, a fixed worm and a molding device defined by two vertically mounted rotating grooved drums.

As the body rotates together with the intake hopper and the die head rigidly coupled thereto, the charged compound is fed into the die head along the thread of the fixed worm. The compound is packed in the die head and extruded in the form of braids through dies disposed vertically about the circumference of the die head bottom. The braids, rotating together with the die head, enter the clearance of the molding device, are gradually cut in equal lengths, rolled up and assume the shape defined by the grooves of the two drums. Having passed the molding section of the drums, the remaining portion of the braid starts growing, and within the time it takes the die head to make a full turn, i.e., by the instant of the next entry into the clearance between the drums, the braid grows to the required size.

At various stages of the process it is often needed to adjust the length of the braid entering the clearance between the drums, for the initial compound charged into the intake hopper of the machine is not homogeneous in terms of its physical and mechanical properties, in consequence of which the braids may vary in length, i.e., their length may differ both ways from that of the drums. If the braids are longer than the molding drums, there are scraps of unmolded braids left, the amount of the rejected material being sometimes as high as half of the total charge. This feature is particularly undesirable, what with the high cost of most kinds of pastelike materials used as feedstock in catalyst production. More serious still, braids much longer than the molding drums, rotating together with the die head, will brush against the body of the molding device, thereby interfering with the normal operation of the latter. If, on the other hand, the braids are shorter than the molding drums, the throughput of the machine will be reduced.

Adjustment of the length of the braids fed into the molding device is also required when switching to a different size of granules.

The length of the braids fed into the molding device can be adjusted by varying the quantity of the compound passing through the die head during one turn of the latter.

However, the quantity of the compound passing through the die head during one turn thereof does not depend only on the geometrical dimensions of the worm.

Thus, if the physical and mechanical properties of the charge deviate from the estimates, as well as when switching to granules of a different size, the worm has to be replaced. In its turn, this operation involves some difficulties as far as the choice of worm parameters is concerned, for the known machine does not permit of controlling the quantity of the compound passing through the die head during one full turn of the latter.

It is an object of the present invention to obviate the above disadvantage.

It is herein contemplated that there shall be provided a machine for granulation of pastelike materials which would permit of controlling the quantity of the pastelike compound passing through the die head during one full turn of the latter, irrespective of the latter's speed of rotation.

Accordingly, the proposed machine for granulation of pastelike materials, comprising an extruder with an attachment for feeding pastelike material, the latter attachment rotating relative to the rotating extruder body, and a rotating die head, in accordance with the invention, has the die head rotated by its own drive independently of the relative rotations of the extruder body and the attachment for feeding pastelike material.

Besides, the die head should be preferably disposed roughly perpendicularly to the extruder body, and the extruder body should be preferably coupled with the die head body by means of a connecting pipe which houses the shaft of the independent drive rigidly connected with a die disk fixed on the body of the die head.

Between the body of the die head and the connecting pipe a packing is preferably provided in the form of a profile-shaped bushing with an annular recess on its outer surface.

It is essential that the inner cavity of the connecting pipe should communicate with the inner cavity defined by the annular recess on the outer surface of the bushing by way of an orifice with a diameter roughly equal to that of the dies formed in the die disk.

The invention will be better understood from the following detailed description taken in conjunction with the accompanying drawings, wherein.

Figure 1:
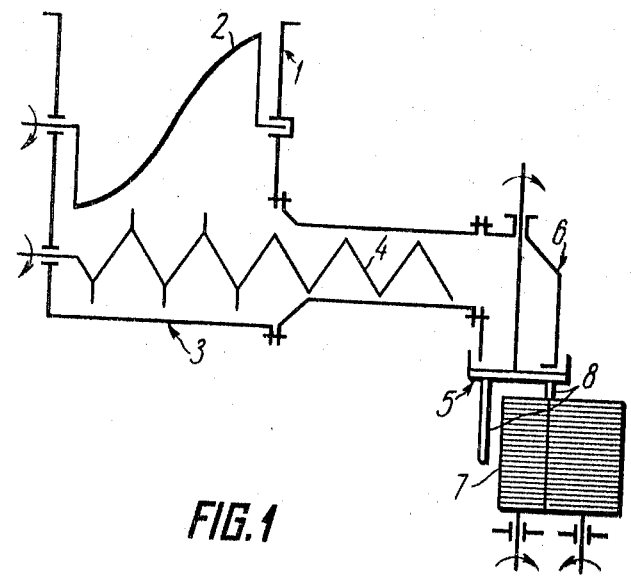
FIG. 1 is a general schematic diagram of a machine for granulation of pastelike material, in accordance with the invention.

The machine of this invention comprises an intake hopper 1 (FIG. 1) which houses two Z-shaped blades 2 mounted on supports and having a rotation drive (not shown); an extruder body 3 which houses a rotatable worm 4 with a controlled drive (not shown). The extruder 3 is coupled with a die head 5 by way of a connecting pipe 6. Immediately below the die head 5 there is mounted a molding device formed by two vertically positioned grooved drum molders 7 fitted with a rotation drive (not shown), the smaller drum having a measure of eccentricity relative to the die head axis. The drawing shows braids 8 of pastelike material.

Figure 2:
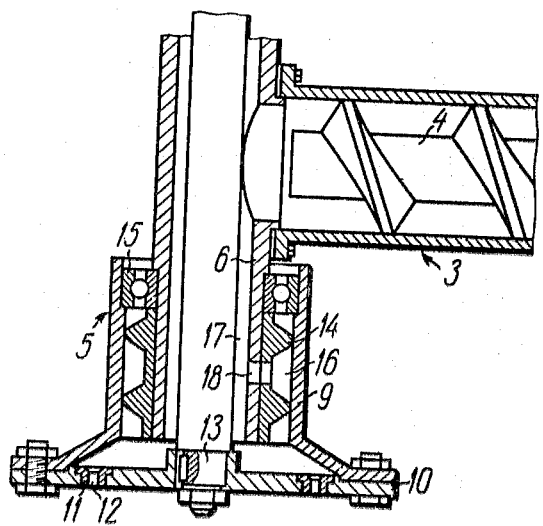
FIG. 2 is a longitudinal section of an extruder with a die head, in accordance with the invention.

The die head 5 (FIG. 2) comprises a body 9, with a die disk 10 fixed thereon. Dies 11 made of some durable material, are securely inserted in the die disk. The diameter of die holes 12 depends on the diameter of the spherical granules being molded.

The connecting pipe 6 is mounted perpendicularly to the body of the extruder 3. The connecting pipe 6 houses the shaft of an independent drive. The die disk 10 bolted to the body 9 of the die head 5, is rigidly fixed on the shaft 13. Thus, the rotation of the die head 5 is transmitted from the independent drive via the shaft 13 and the die disk 10.

At the point of mounting of the die head 5 a profile-shaped bushing 14 is fitted over the connecting pipe 6, which bushing blocks the pastelike material from getting into a bearing 15, whereon the body 9 of the die head 5 is fixed.

There is an annular recess on the outer surface of the profile-shaped bushing 14, a cavity 16 defined by the annular recess and the inner surface of the body 9 of the die head 5 communicating with an inner cavity 17 of the connecting pipes 6 by way of an orifice 18, whereof the diameter is equal to that of the die holes 12.

The proposed machine for granulation of pastelike materials operates in the following manner.

Pastelike compound is charged into the intake hopper 1, wherein it is agitated by the Z-shaped blades 2 and pasted into the thread channel of the worm 4, wherefrom it is fed into the die head 5 and further extruded through the vertical die holes 12 in the die disk 10 in the form of braids 8. The braids 8 of the pastelike material, rotating together with the die head 5, enter the clearance between the drums 7 of the molding device, are gradually cut into equal lengths, rolled up and assume the shape defined by the grooves of the two drums. Having passed the molding section of the drums 7, the part of the braid 8 which is left in the die hole 12, starts growing and during one full turn of the die head 5, i.e., by the instant of the next entry into the inter-drum clearance, its length reaches the required value. In case the length of the braid 8 differs either way from the length of the molding drums by the instant of entry into the inter-drum clearance, the length of the braid 8 is adjusted by varying the quantity of the pastelike compound passing through the die head 5 per unit time, i.e., by varying the speed of rotation of the worm 4 of the extruder 3 with the help of the independent controlled drive.

The speed of rotation of the die head 5 is set such as to rule out inadmissible deviations of the braids 8 from a vertical axis; the actual speed of rotation ranges from 20 40 rev/min.

Simultaneously with being extruded from the die holes 12, the processed pastelike material is forced under pressure into the clearance between the connecting pipe 6 and the rotating die head 5. While the machine is in operation, the material fills but a portion of the cavity 16 defined by the annular recess, whereupon the pressure developed by the profile-shaped bushing 14 is counterbalanced by the pressure in the cavity 17 of the connecting pipe 6 and the flow of the material is interrupted. Thereby the bearing 15 is protected from contact with the material being processed and the material is prevented from being forced out through the clearance between the connecting pipe 6 and the rotating die head 5.

It often happens that the processed material, while in the cavity 16 defined by the annular recess, undergoes a change in its physical and mechanical properties. Thus, by the way of example, the moisture in the material may be forced toward the surface causing a reduction in the coefficient of friction between the processed material and the body of the die head, which detracts from the efficiency of the profile-shaped bushing, with the result that the material will be forced out into the clearance between the connecting pipe 6 and the die head 5. The processed material is also likely to solidify in consequence of chemical reactions, which will lead to the jamming of the rotating parts. In order that the material in the cavity 16 of the annular recess be continuously renewed, the cavity 16 communicates with the cavity 17 of the connecting pipe by way of the orifice 12. The diameter of the orifice 12 is chosen such as to make the pressure drop along the length of the orifice 12 practically equal to the pressure in the cavity 17 of the connecting pipe 6 under conditions of a steady flow of the pastelike material. The material being processed flows from the inner cavity 17 of the connecting pipe 6 into the cavity 16 defined by the annular recess and the inner surface of the body of the die head 5, is forced by the profile-shaped bushing 14 to the die holes and joins the main flow of the pastelike material. The insignificant quantity of the material which has penetrated into the cavity 16 above the orifice is maintained there at a low pressure and does not interfere with the normal operation of the machine even if the processed material undergoes a change in its properties.

Such a design of the machine permits independently controlling the quantity of the pastelike material passing through the die head during one turn thereof, i.e., the length of the braid fed to the molding device; and the speed of rotation of the die head, i.e., the number of braids being fed to the molding device per unit time.

This feature enables one and the same extruder to be used to produce spherical granules of different sizes and from pastelike materials having different properties; it also rules out rejected material in the form of unmolded braids and permits full utilization of the entire working surface of the molding drums, and finally, allows of combining the die head with whatever type of extruder (worm, plunger, disk, etc.) is best suited for a given kind of catalyst.

What we claim is:

1. A machine for granulation of pastelike materials, comprising an extruder with an internally rotating screw and an attachment for feeding pastelike material, said attachment including means adapted to rotate and feed said material to said rotating screw; a rotating die head; a connecting pipe coupling the body of said extruder with the body of said die head; a die disk with dies fixed on the body of said die head; an independent drive with a shaft housed in said connecting pipe and rigidly coupled with said die disk; a packing comprising a profile-shaped bushing with an annular recess on its outer surface said packing located between the body of said die head and said connecting pipe.

2. A machine as defined in claim 1 wherein said connecting pipe has an inner cavity, and the outer surface of said profile-shaped bushing and the inner surface of said die head define a cavity, said cavities communicating with each other by way of an orifice, the diameter of which being substantially equal to the diameter of the dies in said die disk.

* * * * *